Nov. 28, 1933.    A. T. MERTES    1,936,849
PROCESS FOR MAKING BARIUM SALTS
Filed Nov. 2, 1931
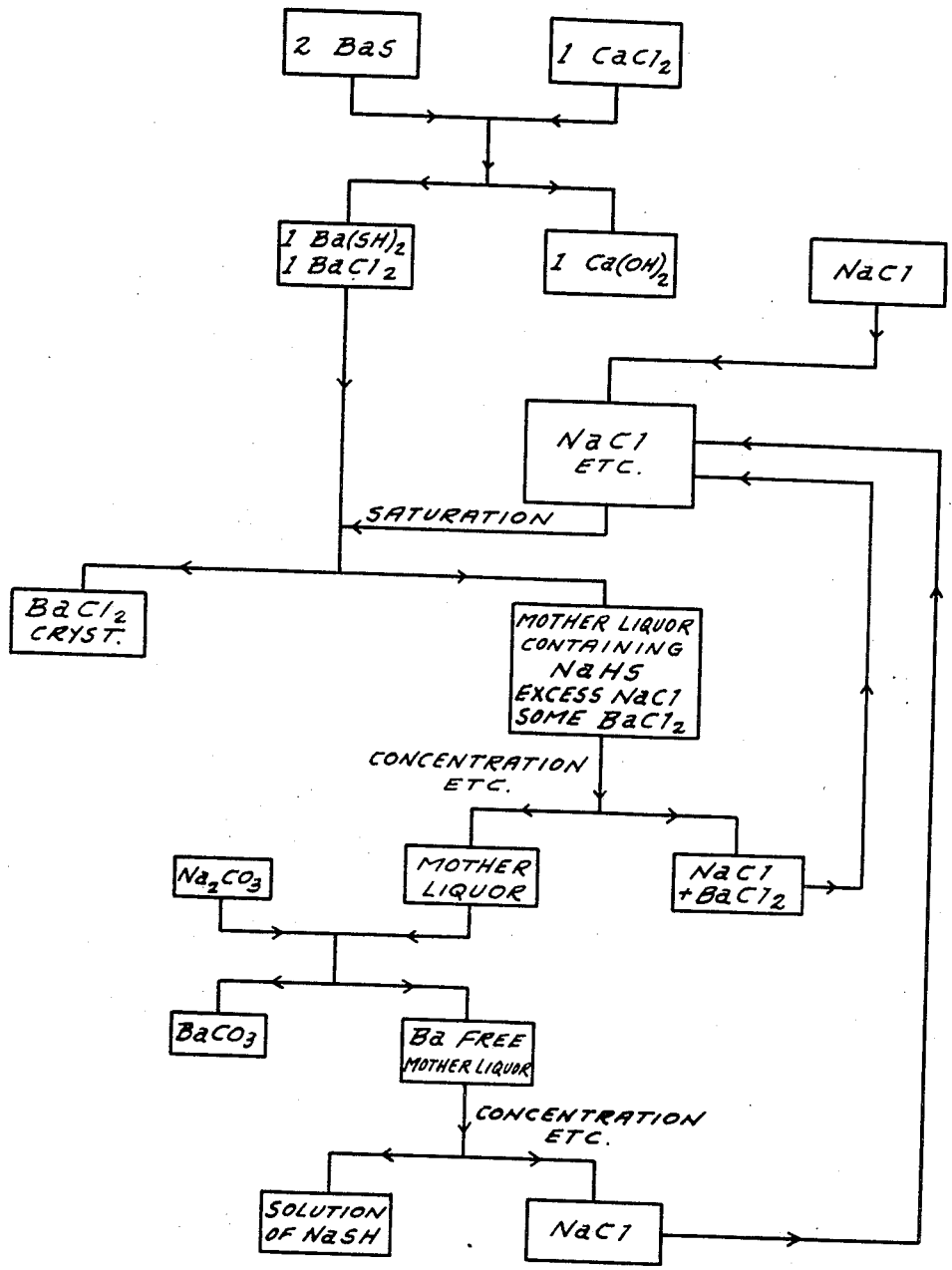
INVENTOR.
ALBERT T. MERTES
BY
ATTORNEY.

Patented Nov. 28, 1933

1,936,849

UNITED STATES PATENT OFFICE 1,936,849

PROCESS OF MAKING BARIUM SALTS

Albert T. Mertes, Newport, Del., assignor to Krebs Pigment & Color Corporation, Newark, N. J., a corporation of Delaware Application November 2, 1931. Serial No. 572,539

3 Claims. (Cl. 23—90)

The present invention relates to a novel, wet process of making barium chloride from a barium sulfur compound, wherein the chlorine required is derived from an alkali metal chloride. The process is further characterized in that valuable by-products, such as sodium sulfur compounds are obtained and part of the reagents needed in this process are used continuously in a closed cycle.

Attempts to produce barium chloride by double decomposition of barium sulfid with soluble alkali metal chlorides have always failed, as the reacting components are prone to form double salts between the sulfids and chlorides, which can only be separated with difficulty.

I have found that when an alkali metal chloride reacts with a solution of barium hydrosulfid no such double salts are formed, but that a double decomposition takes place according to the reaction $$Ba(SH)_2 + 2NaCl \rightarrow BaCl_2 + 2NaSH$$

and that when a large excess of sodium chloride is present the barium chloride formed will be salted-out in very large amounts.

It is true that barium sulfid is in aqueous solution assumed to be hydrolized to $Ba(OH)_2 + Ba(SH)_2$, but for the purpose of the present reaction such a solution acts as if it contained BaS only, and my invention of reacting upon a barium hydrosulfid solution with an alkali metal chloride is limited to such cases where the barium hydrosulfid solution is substantially free from barium hydroxide.

Barium hydrosulfid solutions can be prepared for use in my process in various manners, such as by saturating a barium sulfid solution with hydrogen sulfid.

Another convenient manner of preparing a barium hydrosulfid solution for use in my process consists in carefully neutralizing a solution of barium sulfid with an amount of acid corresponding to the assumed amount of barium hydroxide contained in such a solution. If hydrochloric acid is used for this purpose I obtain in this manner directly a solution of barium hydrosulfid and barium chloride.

Another convenient manner of preparing a similar solution of barium chloride and barium hydrosulfid consists in reacting with calcium chloride upon barium sulfid dissolved in water. Reaction takes place between the calcium chloride and the assumed barium hydroxide content of the barium solution with precipitation of sparingly soluble calcium hydroxide. Any excess of calcium chloride over that required to react with the barium hydroxide present will precipitate calcium sulfid, but as the sulfur content thereof is difficult to recover in a usable form, I prefer to use calcium chloride in an amount corresponding approximately to the assumed barium hydroxide content of the barium sulfid solution, or to half of the barium sulfid, in which case the reactions taking place can be represented by the formulas:

$$2\ BaS \rightleftarrows Ba(SH)_2 + Ba(OH)_2$$

and $$Ba(SH)_2 + Ba(OH)_2 + CaCl_2 \rightarrow Ba(SH)_2 + BaCl_2 + Ca(OH)_2,$$

the calcium hydroxide being substantially insoluble in the barium salts solution obtained, is precipitated.

Based on these observations my invention comprises in its broadest embodiment reacting with an excess of sodium chloride upon a solution of barium hydrosulfid substantially free from barium hydroxide.

In one of its embodiments my invention further comprises reacting with substantially less than two molecular, for instance about one, equivalent of calcium chloride upon an aqueous solution of two molecular equivalents of barium sulfid, as illustrated in the above formulas, and reacting with an excess of sodium chloride upon the solution of barium hydrosulfid and barium chloride obtained in the first operation, whereby crystalline barium chloride is precipitated.

In the further development of my invention I recover the by-products from said precipitated barium chloride and re-use the excess sodium chloride employed to precipitate more barium chloride.

The last and preferred embodiment of my invention is the most economical. It does not require the use of hydrogen sulfid and half of the chlorine needed to form the barium chloride is derived from cheap calcium chloride, which is a by-product in many technical operations.

I will, therefore, in the following describe my invention with particular reference to this process, but it should be understood that the same conditions relating to the precipitation with sodium chloride are applicable to a barium hydrosulfid-barium chloride solution obtained by neutralization of barium sulfid with hydrochloric acid, or to a straight barium hydrosulfid solution:

In its completest embodiment my novel process consists substantially in the following steps:

Calcium chloride is added to a solution of barium sulfid whereby calcium hydroxide is precipitated, leaving in the liquor barium chloride and barium hydrosulfid. This liquor is then saturated with sodium chloride, whereby the barium hydrosulfid reacts to form sodium hydrosulfid and barium chloride, which latter is, due to the salting-out effect of excess sodium chloride, precipitated with the barium chloride formed in the first step of the operation. The so obtained barium chloride is already of high purity and can easily be recrystallized to yield a product conforming to commercial standards.

The mother liquor from the barium chloride contains sodium hydrosulfid, the excess sodium chloride and small amounts of barium chloride. This mother liquor is concentrated by evaporation, yielding a crop of sodium chloride mixed with some barium chloride and this product is returned to the previous saturation step. The remaining mother liquor contains still small amounts of barium compounds which are precipitated as carbonate or sulfate, or as any other insoluble compound by well known methods. This crop of insoluble barium compounds is most conveniently returned to the operation of producing black ash from which the original barium sulfid solution was obtained, or used for any other purpose. The liquor from this barium compound contains substantially nothing but sodium chloride and sodium sulfur compounds. It is concentrated further whereby a further crop of sodium chloride is obtained which can be used in the previous saturation step and a final liquor containing sodium hydrosulfid is obtained.

The appended flow sheet gives a picture of the various steps involved in operating the complete and preferred process of making barium chloride and by-products according to my invention. This flow sheet would appear sufficiently explicit as not to require any comment, except that in the first operations of reacting with calcium chloride upon a barium sulfid solution and recovering therefrom calcium hydroxide and a solution of barium hydrosulfid and barium chloride, the chemical symbols used designate molecular amounts, whereas in the subsequent steps the symbols are merely abbreviations for the names of the compounds and have no significance as to amounts.

The following is a detailed exemplification of the application of my invention to the production of barium chloride crystals. The parts given are by weight.

1191 parts of barium sulfid black ash, containing 766 parts of water soluble Ba, were dissolved in 2000 parts of water at about 80° C. 372 parts of technical calcium chloride containing 280 parts $CaCl_2$ were then added and the slurry heated and stirred for about ½ hour at a temperature of from 70–100° C. The precipitated calcium hydroxide mixed with the insoluble of the black ash was filtered off and discarded. The calcium hydroxide could be recovered in a usable form if the black ash solution had been filtered before the addition of the calcium chloride.

The hot filtrate from the calcium hydroxide was then treated by the addition of 700 parts dry sodium chloride while stirring and cooled to about 30° C. when crude barium chloride crystallized out. This crop of crystals corresponded to 83% of the total barium put into operation and contained 1.1% S; the sulfur content was reduced by washing to 0.1% and by recrystallization a product analyzing over 99.5% $BaCl_2.2H_2O$ was obtained.

In following this procedure a recovery of from 83 to 87% of the barium sulfid content of the black ash as barium chloride can be obtained consistently.

From this point on the working up of the mother liquor of the barium chloride can be varied, but the principles involved in this depend upon precipitation of all of the barium content of the liquor into an insoluble compound, so that the resulting mother liquor contains only sodium salts, which by evaporation can be separated into sodium chloride and sodium sulfur compounds.

The mother liquor from the barium chloride is saturated with sodium chloride and contains some barium chloride and sodium hydrosulfid. While it is possible to precipitate the barium compounds directly therefrom, it is more economical to concentrate this solution, whereby on cooling a crop of sodium chloride with small amounts of barium chloride is obtained. This is then used in the previous precipitation step, and it is only after this preliminary treatment that I prefer to precipitate the barium with soda ash, for instance, the barium carbonate recovered can be used for any desired purpose. When precipitating with sodium sulfate, I re-use the barium sulfate in the manufacture of black ash.

The mother liquor after separation from the barium compounds contains still substantial amounts of sodium chloride and I concentrate this liquor to a point where it contains an amount of sodium sulfur compounds corresponding to 40% NaSH. At this point practically all sodium chloride crystallizes out, the liquor containing about 0.80% NaCl. On continuing the evaporation the amount of sodium chloride therein can be still further reduced.

The mother liquor after final elimination of the sodium chloride contains the sodium sulfur compounds. Due to the various concentration steps, part of the sodium hydrosulfid has been transformed into sodium sulfid. Analysis of such liquors showed, for instance:

|  | Per cent |
|---|---|
| NaSH | 30.48 |
| Na₂S | 9.01 |
| NaCl | 0.80 | and in another instance

| | |
|---|---|
| NaSH | 55.43 |
| Na₂S | 8.54 |
| NaCl | 0.58 |

The solution can be evaporated to dryness and the mixed sodium-sulfid-hydrosulfid finds many technical uses. I can also neutralize the hydrosulfid in the solution with caustic soda and recover then a pure sodium sulfid. Saturation of the solution with hydrogensulfid produces pure sodium hydrosulfid which has many useful applications.

The details of the process described above can be varied in many ways without departing from the spirit of my invention.

In respect to the amount of calcium chloride used in the first step, it should be understood that slight excess or deficiency over the stœchiometric proportions corresponding to the assumed barium hydroxide content of the barium sulfid solution do not impair the working of the process; excess of calcium is precipitated as sulfid and deficiency of chlorine is made up by the excess sodium chloride in the subsequent step.

The amount of sodium chloride needed in the precipitation step will depend upon the concentration of the barium hydrosulfid or barium chloride-barium hydrosulfid solutions. It is, of course, necessary to use an excess of sodium chloride over that required to react with the barium hydrosulfid in solution.

With a 35° Bé. solution twice the theoretical amount of sodium chloride is sufficient to precipitate substantial amounts of barium chloride; with lesser amounts less barium chloride will be precipitated and with larger amounts the precipitated barium chloride will be contaminated with increasing amounts of sodium chloride.

When using more dilute solutions, I can use similar amounts and obtain crystallization after concentration.

As a practical rule, I prefer to add sufficient amounts of sodium chloride so that the mother liquor from the barium chloride crystals will be saturated with sodium chloride, and in operating in this manner I obtain a recovery of over 80% of the barium put into operation directly, as a good barium chloride.

I claim:

1. In a process of making barium hydrosulfid the steps of reacting upon an aqueous solution of barium sulfid with calcium chloride in an amount substantially less than that equivalent to the barium sulfid, and separating the calcium hydroxide formed from the remaining solution of barium salts.

2. In a process of making barium hydrosulfid the steps of adding to an aqueous solution of barium sulfid an amount of calcium chloride approximately equivalent to half the barium sulfid content of said solution and separating the calcium hydroxide formed from the remaining solution of barium salts.

3. In a process of making barium hydrosulfid the steps of reacting at a temperature of about 70 to 100° C. upon a concentrated solution of barium sulfid with an amount of calcium chloride substantially equivalent to half the barium sulfid content of said solution and separating the precipitated calcium hydroxide from the liquor containing the barium salts formed.

ALBERT T. MERTES.